Jan. 19, 1932.  E. H. BERGH  1,841,398
PRACTICE VIOLIN
Filed Oct. 7, 1929
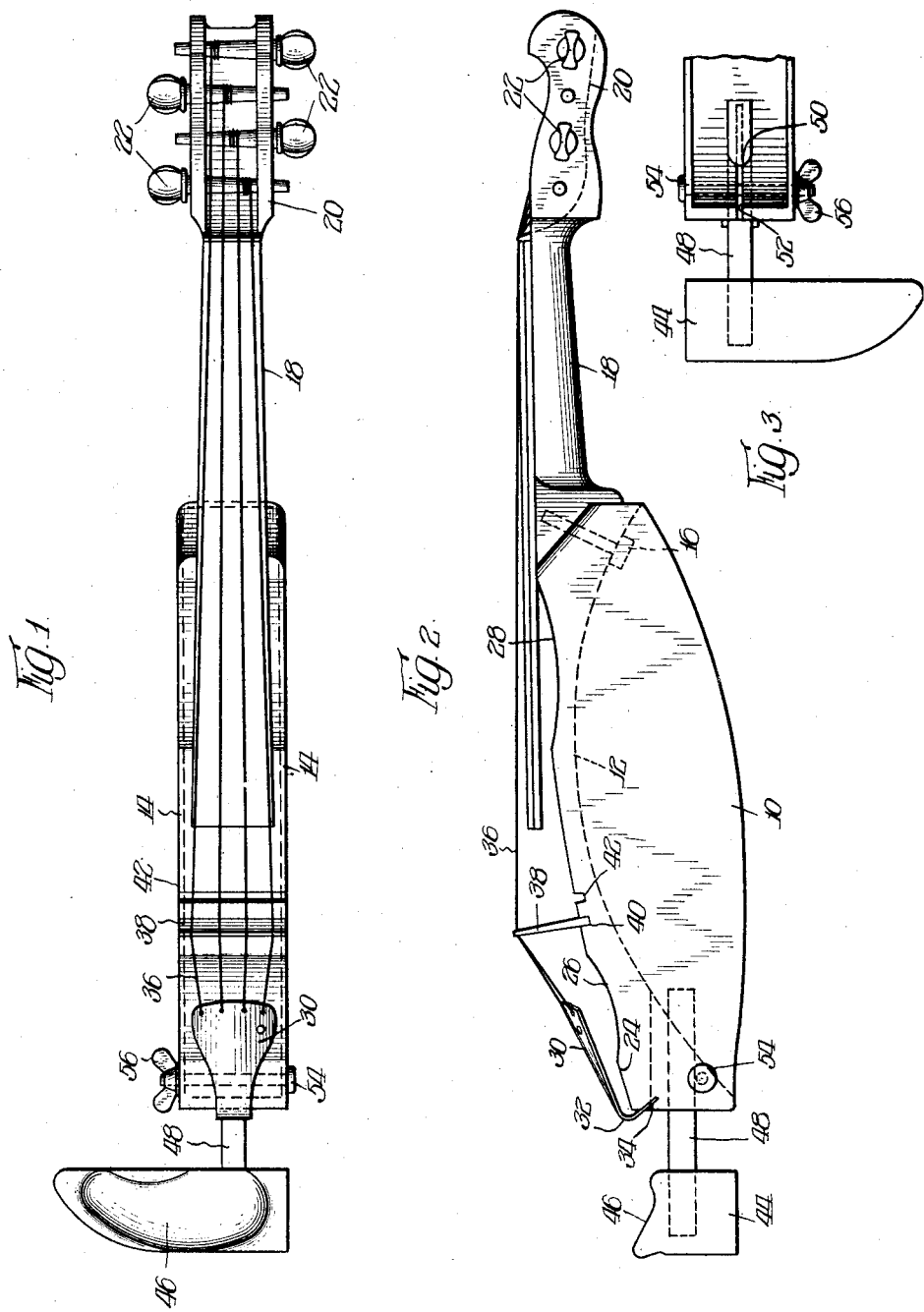
Inventor:
Edwin H. Bergh, Patented Jan. 19, 1932

1,841,393

UNITED STATES PATENT OFFICE

EDWIN H. BERGH, OF STERLING, ILLINOIS, ASSIGNOR TO GAMBLE HINGED MUSIC CO., OF CHICAGO, ILLINOIS, A CORPORATION OF SOUTH DAKOTA

PRACTICE VIOLIN

Application filed October 7, 1929. Serial No. 398,003.

The invention relates to improvements in musical instruments and has reference more particularly to that type of instrument employing vibrating strings, such as violins, cellos and the like.

Heretofore it has been the custom in music schools and institutions wherein music is taught to provide the student with a full size standard instrument upon which instruction to the student was given, and which he was allowed to use during his practice hours. This, of course, necessarily added to the expense and maintenance of the schools when they assumed the cost of providing each student with a standard instrument, or else it became incumbent on the student to provide himself with a desirable instrument.

It is therefore one of the primary objects of the present invention to provide a simple and inexpensive substitute for musical instruments which can be played in the same manner, producing a close imitation of tone of the standard instruments, and which therefore will be suitable for use by students during their term of instruction.

It is a further object of the present invention to provide a substitute for a stringed instrument primarily for use in class instruction which will produce a tone similar in quality to that of a standard instrument, but substantially muted in comparison thereto.

Another object of the invention is to provide a stringed instrument of simple construction which can be formed substantially out of a single piece of material so that the whole body of the instrument functions as a sounding board.

A yet further object is to provide a stringed instrument having an adjustable end piece for use as a chin rest by means of which the length of the instrument can be varied as desired.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a plan view of the musical instrument comprising the present invention;

Figure 2 is a side elevation of the same; and

Figure 3 is a detail view of the construction for securing the chin rest to the body of the instrument.

The device consists of a body member 10 of block-like formation, oblong in contour and having a cavity formed in one of its sides which extends as far as the broken line 12. By reason of the cavity in the body member, which is preferably formed in the elongated side, a pair of thin walls 14 are secured which, in connection with the cavity, transforms the body into a shell-like member so that it functions as a sounding board. Secured to the body by a suitable securing bolt 16 is a combined neck and finger board 18 having a head 20 which is recessed for accommodation of the keys 22. Although the embodiment of the invention as disclosed in the drawings contemplates the use of a finger board which is separate from the body portion, it is to be understood that the invention is not necessarily limited thereto, but can also be embodied in a device employing a finger board integral with and forming a continuation of the body portion.

At the end opposite to the combined neck and finger board the body portion is provided with an inclined face 24 and a recessed portion 26. The part of the body member 10 overlapped by the finger board 18 is also recessed as shown at 28 to provide a clearance space for the finger board so that both members will be free to vibrate without interference from each other.

Secured to the body portion adjacent the inclined face 24 is a tail piece 30 having a bent end 32 held in slot 34 provided for that purpose in the rear end of the body member. Strings 36 extend from the tail piece over a bridge 38 and are secured at their other end to the keys 22. The bridge rests in a groove 40, in which position the instrument will produce a certain character of tone. A groove 42 is also provided spaced from the groove 40 and located closer to the finger-board 18. The bridge 38 when inserted in this groove functions to vary the finger spacing, thus rendering the instrument substantially similar to a three-quarter violin.

The instrument is provided with an adjustable end piece 44 which serves as a chin rest 46. By securing the end piece either in towards, or away from, the body member, the length of the instrument can be varied as desired. The chin rest is formed integral with the end piece and is provided with suitable surface contours for the accommodation of the chin of the operator. The construction employed for securing the end piece to the body member is shown in Figure 3 wherein the tubular rod 48 has one end firmly secured to the end piece, and the other end inserted into the opening 50 provided for the purpose in the body member. Leading from the lower edge of the opening 50 is a channel 52 which, in combination with the transverse bolt 54 and thumb nut 56, serves to increase or lessen the frictional resistance on the tubular rod so that the attached end piece, and consequently the chin rest, can be secured in any position desired.

A desirable feature of the chin rest is the adjustability secured in relation to the body member 10 of the instrument. The member 44 can be extended longitudinally within certain limits and can be secured at various angles to the body portion by reason of the tubular rod 48. This allows the instrument to be held in a vertical plane with the chin rest at that angle best suited to the particular operator.

The construction disclosed as comprising the present invention has those characteristics most similar to a violin and is adapted to be played with a bow in a manner as a standard violin is played. Various changes, however, can be made in the proportions of the parts so that the instrument will similate a cello or any other type of stringed instrument desired.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a stringed musical instrument, a body member hollowed out in one of its sides, a combined neck and finger board, means for securing said neck and finger board to one end of the body member, a transverse slot provided in the other end of said body member, a bridge resting on said body member, a tail piece detachably secured in said slot, and strings fastened to said neck and tail piece respectively and passing over said bridge.

2. In a stringed musical instrument, a body member hollowed out in one of its sides, a combined neck and finger board secured to one end of the body member, a tail piece secured to the other end of the body member, a universally adjustable end piece secured to said body member adjacent said tail piece and a chin rest in combination with said end piece.

3. In a stringed musical instrument, a body member hollowed out in one of its sides, a combined neck and finger-board secured to one end of the body member, a tail piece secured to the other end of the body member, a universally adjustable end piece frictionally secured to said body member adjacent the tail piece, and a chin rest integral with said end piece.

4. In a stringed musical instrument, a body member hollowed out in one of its sides, a combined neck and finger-board secured to one end of the body member, a tail piece secured to the other end and connected to said neck by strings, said body member being provided with an opening adjacent the tail piece for receiving a tubular rod, parts of the body member adjacent the rod being separated by a channel communicating with the opening, and means for varying the width of said channel to apply friction to said rod.

5. In a stringed musical instrument, a body member hollowed out in one of its sides, a combined neck and finger-board, means for securing said neck and finger-board to one end of the body member, the other end having a transverse slot for receiving a tail piece, said last mentioned end of the body also having an opening provided therein, a chin rest including a supporting rod adapted to be adjustably located in said opening, and strings fastened to said neck and tail piece and contacting a bridge supported on the body member.

Signed at Chicago, Illinois, this 21st day of September, 1929.

EDWIN H. BERGH.